United States Patent
Leu et al.

(10) Patent No.: US 12,075,160 B2
(45) Date of Patent: Aug. 27, 2024

(54) IMAGE SIGNAL PROCESSOR AND IMAGE PROCESSING DEVICE

(71) Applicant: SAMSUNG ELECTRONICS CO., LTD., Suwon-si (KR)

(72) Inventors: Ho June Leu, Hwaseong-si (KR); Joong Sik Kim, Seoul (KR); Dong Yeob Shin, Seoul (KR); Yeong Min Lee, Hwaseong-si (KR); Hoon Jo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 17/693,553

(22) Filed: Mar. 14, 2022

(65) Prior Publication Data

US 2022/0385817 A1    Dec. 1, 2022

(30) Foreign Application Priority Data

May 26, 2021  (KR) .................. 10-2021-0067360
Jul. 16, 2021  (KR) .................. 10-2021-0093600

(51) Int. Cl.
*H04N 23/68*  (2023.01)
*G06T 5/50*   (2006.01)
(Continued)

(52) U.S. Cl.
CPC ............ *H04N 23/683* (2023.01); *G06T 5/50* (2013.01); *G06T 7/11* (2017.01); *G06T 7/194* (2017.01);
(Continued)

(58) Field of Classification Search
CPC .... H04N 23/683; H04N 23/65; H04N 17/002; H04N 23/45; G06T 5/50; G06T 7/11;
(Continued)

(56) References Cited

U.S. PATENT DOCUMENTS 6,879,731 B2    4/2005  Kang et al.
8,340,185 B2   12/2012  Biswas et al.
(Continued)

FOREIGN PATENT DOCUMENTS

JP    2003-018604 A    1/2003
JP    2012-142829 A    7/2012
(Continued)

OTHER PUBLICATIONS

Yu et al. "Selfie Video Stabilization", IEEE Trans., vol. 43, No. 2, Jul. 30, 2019.
(Continued)

*Primary Examiner* — Mekonnen D Dagnew
(74) *Attorney, Agent, or Firm* — Muir Patent Law, PLLC

(57) ABSTRACT

An image processing device is provided. The image processing device includes an image signal processor for processing a raw image received from a camera and a memory for storing a previous frame of the raw image and an intermediate image generated by the processing, wherein the image signal processor estimates an initial global motion vector between the previous frame and a current frame, receives focus region information in the raw image, divides the raw image into a foreground (FG) region and a background (BG) region based on the focus region information, generates a final global motion vector by divisionally updating the initial global motion vector based on the FG region and the BG region, performs motion compensation by applying the final global motion vector to the previous frame, and outputs a final image by blending the motion-compensated previous frame with the current frame.

19 Claims, 10 Drawing Sheets

(51) Int. Cl.
  *G06T 7/11* (2017.01)
  *G06T 7/194* (2017.01)
  *G06T 7/246* (2017.01)

(52) U.S. Cl.
  CPC .... *G06T 7/248* (2017.01); *G06T 2207/20084* (2013.01); *G06T 2207/30201* (2013.01)

(58) Field of Classification Search
  CPC ............ G06T 7/194; G06T 7/248; G06T 2207/20084; G06T 2207/30201; G06T 2207/10024; G06T 2207/10048; G06T 2207/20021; G06T 2207/20081; G06T 7/269; G06T 5/003
  See application file for complete search history.

(56) References Cited

U.S. PATENT DOCUMENTS

| | | |
|---|---|---|
| 9,123,115 B2 | 9/2015 | Zhang et al. |
| 9,883,102 B2 | 1/2018 | Yamada |
| 2013/0170557 A1* | 7/2013 | Wang ............... H04N 19/174 375/240.24 |
| 2015/0022677 A1* | 1/2015 | Guo ............... H04N 23/6811 348/208.1 |
| 2015/0054974 A1* | 2/2015 | Ehmann ............... G06T 7/11 348/218.1 |
| 2017/0236288 A1* | 8/2017 | Sundaresan ............ G06T 7/215 382/173 |
| 2018/0255290 A1 | 9/2018 | Holzer et al. |
| 2019/0045192 A1* | 2/2019 | Socek ................ H04N 19/573 |
| 2019/0180454 A1* | 6/2019 | Choudhury .......... H04N 19/139 |

FOREIGN PATENT DOCUMENTS

| | | |
|---|---|---|
| KR | 10-2007-0120416 A | 12/2007 |
| KR | 10-2014-0147123 A | 12/2014 |

OTHER PUBLICATIONS

European Office Action dated Sep. 2, 2022 and European Search Report dated Aug. 30, 2022.

* cited by examiner

IMAGE SIGNAL PROCESSOR AND IMAGE PROCESSING DEVICE

CROSS-REFERENCE TO RELATED APPLICATIONS

This application claims priority from Korean Patent Application No. 10-2021-0067360 filed on May 26, 2021, and Korean Patent Application No. 10-2021-0093600 filed on Jul. 16, 2021, in the Korean Intellectual Property Office and all the benefits accruing therefrom under 35 U.S.C. 119, the contents of which in their entirety are herein incorporated by reference.

BACKGROUND

1. Field

Embodiments relate to an image signal processor that performs motion compensation and an image processing device.

2. Description of the Related Art

When an electronic device performs photographing without using an additional external device such as a tripod that removes shaking, a phenomenon in which photographed images are shaken due to hand shaking of a photographer or vibration caused by movement of the photographer may occur.

SUMMARY

One embodiment provides an image processing device, which includes an image signal processor for processing a raw image received from a camera and a memory for storing a previous frame of the raw image and an intermediate image generated by the processing, wherein the image signal processor estimates an initial global motion vector between the previous frame and a current frame, receives focus region information in the raw image, divides the raw image into a foreground (FG) region and a background (BG) region based on the focus region information, generates a final global motion vector by divisionally updating the initial global motion vector based on the FG region and the BG region, performs motion compensation by applying the final global motion vector to the previous frame, and outputs a final image by blending the motion-compensated previous frame with the current frame.

Another embodiment provides an image processing device, which includes a camera module for outputting a raw image captured by a front camera, a neural processing unit (NPU) for detecting focus region information from the raw image and an application processor for separating the raw image for each region in accordance with the focus region information and generating a final global motion vector updated from an initial global motion vector, and outputting a final image to which the final global motion vector is applied, wherein the application processor is configured to, segment the raw image into a plurality of macro blocks including a plurality of rows and columns, estimate the initial global motion vector by comparing a previous frame with a current frame for each macro block, divide the raw image into a foreground region, a background region and a gray region in accordance with the focus region information, remove an outlier from each of a first global motion vector for the foreground region and a second global motion vector for the background region, and generate the final global motion vector by updating the gray region based on the first and second global motion vectors from which the outlier has been removed.

Another embodiment provides an image signal processor, which includes a pre-processing block for receiving a raw image from a camera module to transform a format of the raw image, a motion estimation (ME) block for segmenting the raw image of the transformed raw image format into a plurality of macro blocks and estimating an initial global motion vector between a previous frame and a current frame, a motion estimation real time algorithm (ME RTA) block for generating a label map that has divided the plurality of macro blocks into a plurality of regions based on focus region information, and outputting a final global motion vector updated from the initial global motion vector based on the label map, a motion comparison (MC) block for performing motion compensation for the previous frame based on the final global motion vector and a mixer for outputting a final image obtained by blending the motion-compensated previous frame with the current frame.

BRIEF DESCRIPTION OF THE DRAWINGS

Features will become apparent to those of skill in the art by describing in detail example embodiments with reference to the attached drawings in which.

DETAILED DESCRIPTION

Figure 1:
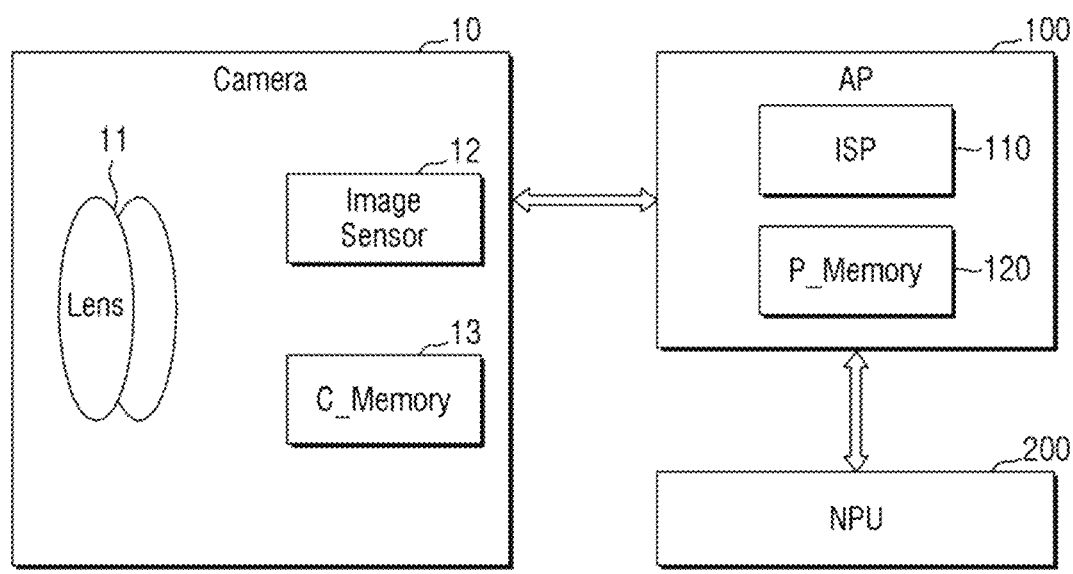
FIG. 1 illustrates an electronic device including an image processing device according to some embodiments.

FIG. 1 illustrates an electronic device including an image processing device according to some embodiments.

Referring to FIG. 1, an electronic device (not shown in FIG. 1, see FIG. 9 below) may include a camera module 10 and an application processor (AP) 100.

According to an embodiment, the electronic device may include two or more camera modules 10 having their respective attributes or functions different from each other. In this case, e.g., at least one camera module 10 may be a wide-angle camera or a front camera, and at least one other camera module may be a telephoto camera or a rear camera.

The electronic device may generate a raw image by photographing an object through the camera module 10, and may generate a final output image by processing the raw image through the AP 100.

The electronic device may further include an NPU (neural network processing unit) 200 in accordance with some embodiments. The electronic device may perform learning used for image motion correction or learning for specific region detection through the NPU 200 capable of performing neural network learning. The following description will be based on the NPU 200 by way of example. However, in case of a processor for performing neural network learning in accordance with various embodiments, the processor may correspond to the NPU even though it is called a graphic processing unit (GPU), a display processing unit (DSP), or the like.

The camera module 10 may include a lens assembly 11, an image sensor 12, and a memory (C_Memory) 13. The AP 100 may include an ISP 110 and a memory (P_Memory) 120 (e.g., buffer memory).

The lens assembly 11 may collect light emitted from an object to be photographed as an image. The lens assembly 11 may include one or more lenses. According to an embodiment, the camera module 10 may include a plurality of lens assemblies 11. In this case, the camera module 10 may be, e.g., a dual camera, a 360° camera, or a spherical camera. The plurality of lens assemblies 11 may have the same lens attribute (e.g., angle of view, focal length, autofocus, f number, or optical zoom), or at least one lens assembly may have at least one lens attribute different from that of at least one another lens assembly. The lens assembly 11 may include, e.g., a wide-angle lens or a telephoto lens.

Although not shown in FIG. 1, the camera module 10 may further include a flash. The flash may emit a light source that is used to enhance light emitted from the object. The flash may include one or more light emitting diodes (e.g., red-green-blue (RGB) LED, white LED, infrared LED, or ultraviolet LED), or xenon lamp.

According to an embodiment, the image sensor 12 may acquire an image corresponding to the object by transforming the light transferred from the object through the lens assembly 11 into an electrical signal. According to an embodiment, the image sensor 12 may include one image sensor selected from image sensors having different attributes, such as an RGB sensor, a black and white (BW) sensor, an IR sensor, or a UV sensor, a plurality of image sensors having the same attribute, or a plurality of image sensors having different attributes. Each image sensor included in the image sensor 12 may be implemented as a charged coupled device (CCD) sensor or a complementary metal oxide semiconductor (CMOS) sensor, for example.

According to an embodiment, the camera module 10 may store an image related to operation or data related to operation in the memory 13.

The memory 13 may include a cache memory, a read-only memory (ROM), a programmable read-only memory (PROM), an erasable PROM (EPROM), an electrically erasable programmable read-only memory (EEPROM), a phase-change RAM (PRAM), a flash memory, a static RAM (SRAM), or a dynamic RAM (DRAM) as an operation memory in accordance with some embodiments. In various implementations, the memory may include a flash memory, or a resistive memory, such as a resistive RAM (ReRAM), a phase change RAM (PRAM) and a magnetic RAM (MRAM), as a non-volatile memory device in accordance with some embodiments. The non-volatile memory device may also include an integrated circuit, which includes a processor and a RAM, e.g., a storage device or a processing in memory (PIM).

According to an embodiment, the ISP 110 may perform image processing (e.g., depth map generation), three-dimensional modeling, panorama generation, feature point extraction, image synthesis, or image compensation (e.g., noise reduction, resolution adjustment, brightness adjustment, blurring, sharpening, or softening) with respect to the image acquired through the image sensor 12 or the image stored in the memory. In various implementations, the ISP 110 may perform control (e.g., exposure time control, or read out timing control, etc.) for at least one (e.g., image sensor 12) of components included in the camera module 10.

The ISP 110 may perform and output a denoising image through motion compensation for the raw image received from the camera module 10.

In detail, the ISP 110 may pre-process the received raw image of RGB format in YUV format. The ISP 110 may estimate an initial global motion vector between the previous frame and the current frame based on a luminance signal Y from the raw image of YUV format. The ISP 110 may receive focus region information from the NPU 200. The focus region information may mean a feature region of the object in the captured raw image. For example, when the object is a person, the focus region information may be a face region where eyes, nose, and mouth of a person exist. For example, when the object is a vehicle, the focus region information may be learned based on a main structure such as a wheel, a front glass window, etc. of the vehicle. For example, when the object is an animal, the focus region information may be learned based on main body features of the corresponding animal.

The ISP 110 may detect the raw image of YUV format as a foreground (FG) region and a background (BG) region, respectively, based on the focus region information. Thus, the ISP 110 may generate a label map for dividing the detected FG region from the detected BG region, and estimate a global motion vector (hereinafter, referred to as a first global motion vector) for the FG region and a global motion vector (hereinafter, referred to as a second global motion vector) for the BG region, respectively.

As another example, the ISP 110 may use additional other information (e.g., gyro information, etc.) in addition to the focus region information, to further elaborate the FG region detection.

The ISP 110 may update the initial global motion vector based on optical flow information between the previous frame and the current frame of the YUV format raw image, the first global motion vector, and the second global motion vector.

In detail, a portion that is ambiguous as to whether it is the FG region or the BG region in the label map may be determined as a gray region. The ISP 110 may estimate a local motion vector (LMV) of the FG region based on the optical flow information between the previous frame and the current frame of the YUV format raw image, the first global motion vector, and the second global motion vector. The ISP 110 may determine the motion vector for macro blocks of the gray region as the FG region or the BG region based on the local motion vector LMV. In various implementations, the ISP 110 may determine the motion vector of the macro blocks of the gray region as a weighted average value of the FG region and the BG region. The ISP 110 may perform motion compensation for the previous frame based on a corrected global motion vector field MVF', to which the first global motion vector, the second global motion vector, and the local motion vector are all applied.

The ISP 110 may generate and output the current frame, in which time-axis noise is reduced, by blending (or mixing) the motion-compensated previous frame with the current frame.

The final image processed by ISP 110 may be again stored in the memory 120 or transferred to an external component of the camera module 10, for further processing.

According to an embodiment, the ISP 110 may be configured as at least a portion of the application processor 100 as shown, or may be configured as a separate processor operating independently of the processor in accordance with another embodiment. When the ISP 110 is configured as a separate processor, the final images processed by the ISP 110 may be displayed as it is by a processor or through a display device (not shown in FIG. 1, see FIG. 9 below) after additional image processing.

According to an embodiment, the memory 120 may temporarily store at least a portion of the image acquired through the image sensor 12 for next image processing operation. For example, when image acquisition according to a shutter is delayed or a plurality of images are acquired at high rate, an acquired raw image (e.g., image of high resolution) may be stored in the memory 201, and a corresponding copy image (e.g., image of low resolution) may be previewed through the display device. Afterwards, when a designated condition is satisfied (e.g., user input or system command), at least a portion of the original image stored in the memory 120 may be acquired and processed, e.g., by the ISP 110. For example, when motion compensation for the current frame is performed, the previous frame may be stored in the memory 120, and the motion-compensated previous frame may also be stored in the memory 120. According to an embodiment, the memory 120 may be included as at least a portion of the application processor 100 or the ISP 110, or a separate memory operated independently of the application processor 100 or the ISP 110.

The memory 120 may include a cache memory, a read-only memory (ROM), a programmable read-only memory (PROM), an erasable PROM (EPROM), an electrically erasable programmable read-only memory (EEPROM), an phase-change RAM (PRAM), a flash memory, a static RAM (SRAM), or a dynamic RAM (DRAM) as an operation memory in accordance with some embodiments. In various implementations, the memory may be a non-volatile memory device, and may include a flash memory, or a resistive memory, such as a resistive RAM (ReRAM), a phase change RAM (PRAM) and a magnetic RAM (MRAM), as a non-volatile memory device in accordance with some embodiments. The non-volatile memory device may also include an integrated circuit, which includes a processor and a RAM, e.g., a storage device or a processing in memory (PIM).

Figure 2:
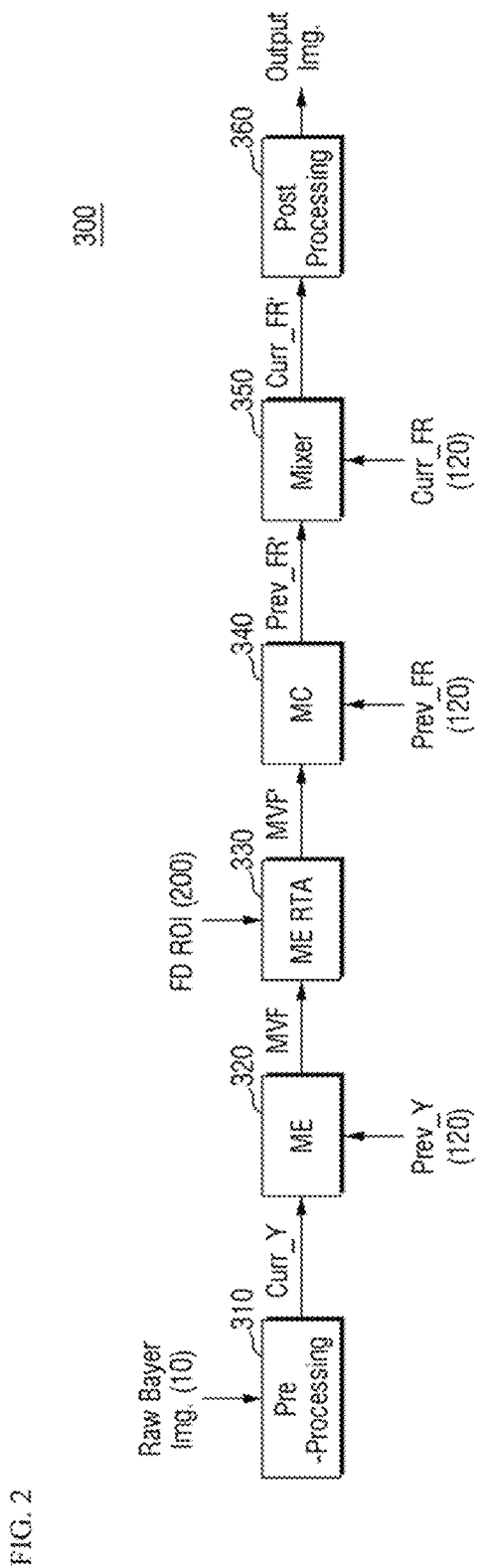
FIG. 2 illustrates the image signal processor shown in FIG. 1 in detail in accordance with some embodiments.

FIG. 2 illustrates the image signal processor shown in FIG. 1 in detail in accordance with some embodiments.

In accordance with some embodiments, the ISP 110 of FIG. 1 may be implemented like the ISP 300 of FIG. 2.

The ISP 300 may receive a raw image from the camera module 10 in a frame unit.

Referring to FIG. 2, the ISP 300 may include a pre-processing block 310, an ME block (motion estimation block) 320, an ME RTA block (motion estimation real time algorithm block) 330, an MC block (motion compensation block) 340, a mixer 350, and a post-processing block 360.

The pre-processing block 310 may process the raw image captured in an RGB format of a Bayer pattern by the camera module 10 as a raw image of YUV format based on luminance.

Figure 7:
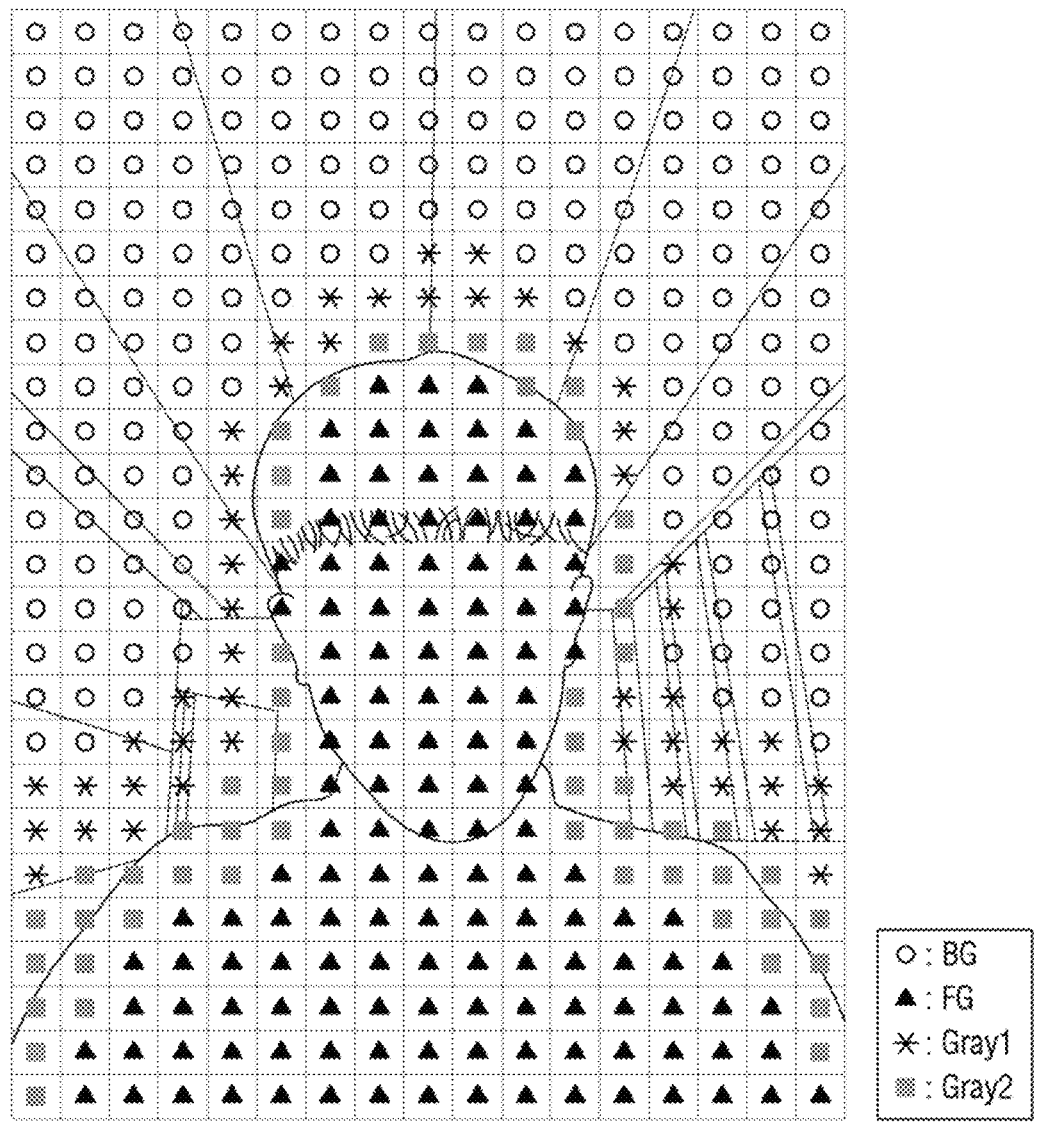
FIG. 7 is an image illustrating initial detection of the image of FIG. 6 as a foreground region, a background region, and a gray region in accordance with some embodiments.
Figure 8:
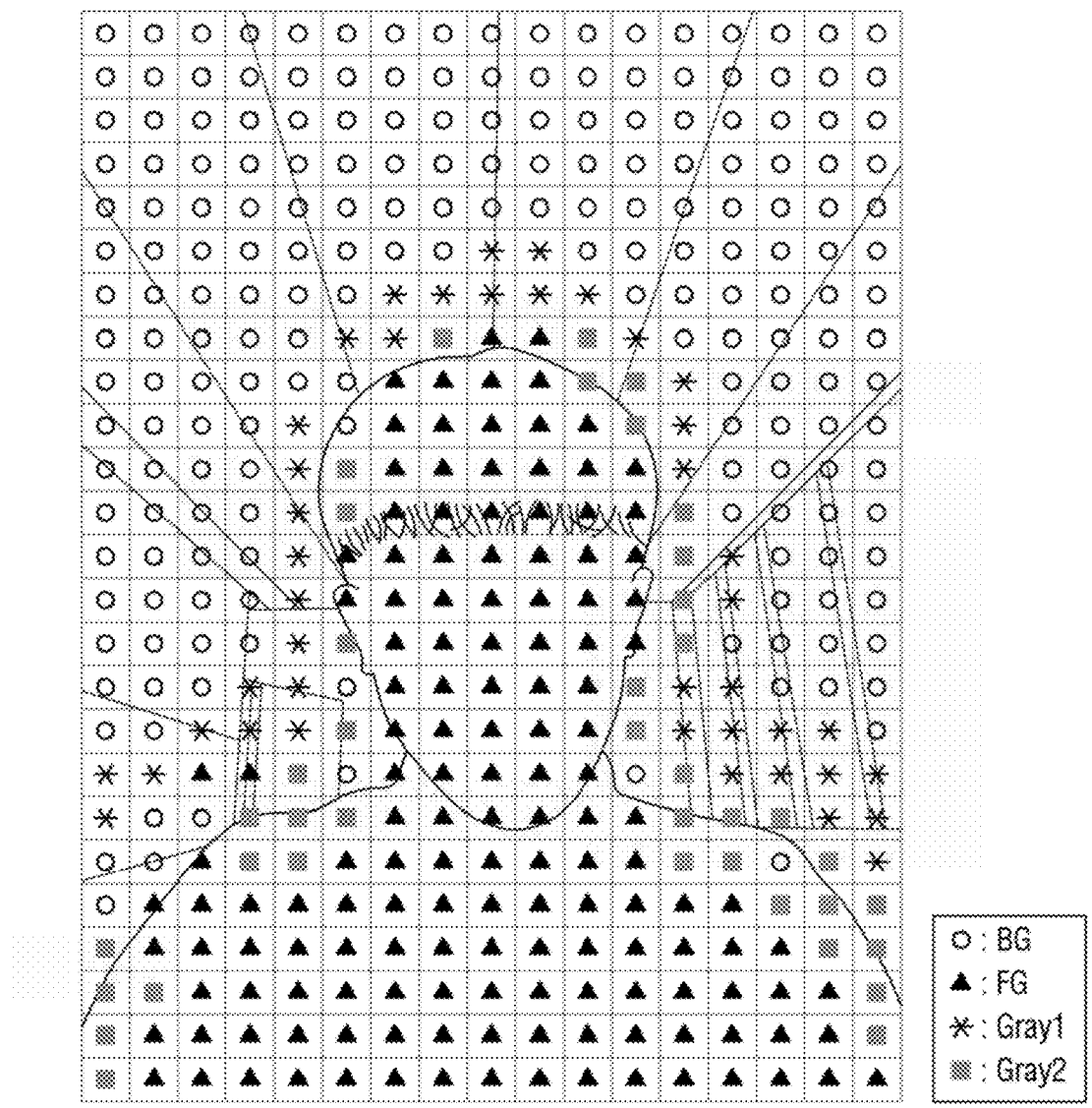
FIG. 8 is an image illustrating that the foreground region, the background region, and the gray region of the image of FIG. 7 are readjusted by applying motion compensation thereto.

The ME block 320 may segment the raw image of YUV format into macro blocks of a preset size. For example, the raw image may be segmented into a plurality of macro blocks divided into a plurality of rows and columns, as shown in FIGS. 7 and 8.

The ME block 320 may find the same position from the previous frame (Prev_Y) with respect to each macro block, and estimate a motion vector between the corresponding macro block of the previous frame (Prev_Y) and the macro block of the current frame (Curr_Y). The estimated motion vector may be caused by, e.g., global motion according to movement of the camera itself or movement of the object. The ME block 320 may compare the macro block of the previous frame (Prev_Y) with the macro block of the current frame (Curr_Y) to estimate an initial global motion vector field (MVF) for the entire raw image.

The ME RTA block 330 may perform division into the foreground region FG, the background region BG, and the gray region based on the focus region information of the raw image. The focus region information may be information indicated by the NPU 200 to the ISP 110.

The NPU 200 may perform learning processing using a neural network, and for example, may extract a feature region from the object, and may update and determine a feature point, a boundary, etc. of the feature region through learning processing. For example, when the camera module 10 is a front camera and a captured object includes a face of a person, the NPU 200 may detect a face region including eyes, nose, and mouth of a person, learn the face region based on the feature point included in the feature region, and determine a boundary of the focus region, thereby informing the ME RTA block 330 of the determined boundary.

The ME RTA block 330 may generate a label map for the current frame based on the focus region information. The label map may be indicated by detecting whether each macro block belongs to the FG region or the BG region. The ME RTA block 330 may divide the initial global motion vector field (MVF) into the FG region and the BG region, respectively, by applying the label map.

When a predetermined macro block has an ambiguous value as to whether it is determined as the FG region or the BG region, the ME RTA block 330 may determine the predetermined macro block as a gray region.

The gray region may be set to the same level in accordance with one embodiment, but may be set to a plurality of levels divided depending on a range to which a value belongs, in accordance with another embodiment. For example, the gray region may be determined as a first gray region when it is close to an intermediate value of the FG region and the BG region, and may be determined as a second gray region when it is closer to the FG region or the BG region within a predetermined range than the intermediate value.

The ME RTA block 330 may estimate a first global motion model based on the first global motion vector of the FG region with respect to the optical flow information between the previous frame and the current frame of the raw image of YUV format, and estimate a second global motion model based on the second global motion vector of the BG region. In this case, the optical flow information may include a global motion vector field, a brightness difference, and edge strength information between the previous frame and the current frame.

The estimated global motion models may be applied to the FG region and the BG region of the previous frame, respectively. According to some embodiments, a homography matrix may be used as the global motion model for motion vector estimation.

The ME RTA block 330 may filter an outlier from the first global motion vector and the second global motion vector. For example, a motion vector having a value exceeding a preset threshold value may be detected as the outlier, and then removed from the model so as not to be used for motion estimation. When the object is a person, e.g., and the person wears clothes of a stripe pattern or tile pattern, some values that are detected due to the pattern of the clothes may be determined as outliers and filtered in the FG region. When the background of the object is a wall or tile having a uniform pattern, some values that are detected due to the pattern of the clothes may be determined as outliers and filtered in the BG region.

The ME RTA block 330 may estimate a final global motion vector for the gray region based on the first global motion vector and the second global motion vector, from which the outliers are removed. As an example, a macro block that is ambiguous as to whether it is the FG region or the BG region when the initial global motion vector field is estimated may be additionally incorporated into any one of the FG region or the BG region when the motion vector is estimated again. Thus, the ME RTA block 330 may generate the final global motion vector MVF' by updating the initial global motion vector based on the first global motion vector and the second global motion vector, from which the outliers are removed.

The MC block 340 may perform motion compensation. The MC block 340 may apply the final global motion vector MVF' received from the ME RTA block 330 to the previous frame, so as to generate a previous frame Prev_FR' of which time axis noise is reduced.

The mixer 350 may blend the motion-compensated previous frame Prev_FR' with the current frame Curr_FR to generate a motion-compensated current frame Curr_FR'.

The post-processing block 360 may perform another image processing for the motion-compensated current frame Curr_FR' to output a final image. A post-processing operation may be, e.g., digital image stabilization or the like.

Figure 3:
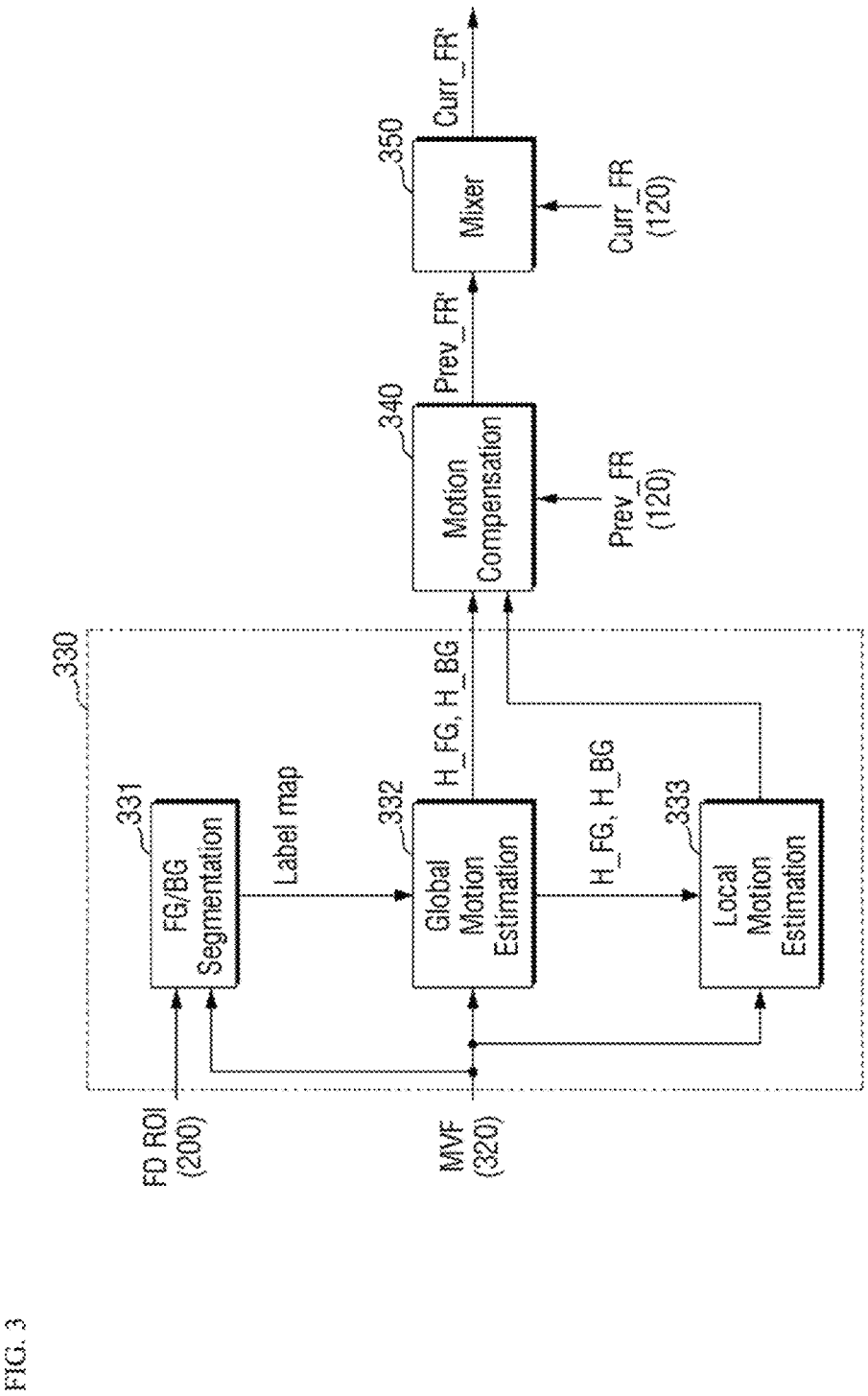
FIG. 3 illustrates the image signal processor shown in FIG. 2 in more detail in accordance with some embodiments.

FIG. 3 illustrates the image signal processor shown in FIG. 2 in more detail in accordance with some embodiments.

Referring to FIG. 3, the ME RTA block 330 may include a region segmentation block (FG/BG segmentation block) 331, a global motion estimation block 332, and a local motion estimation block 333.

The region segmentation block 331 receives focus region information (FD ROI) from the NPU 200. The region segmentation block 331 may extract a foreground region FG and a background region BG from optical flow information between two frames (previous frame and current frame) based on the focus region information. At this time, among a plurality of macro blocks of a raw image, a macro block that is ambiguous whether it is the FG region or the BG region may be detected as a gray region. The optical flow information may include an initial global motion vector field (MVF), brightness difference information between the two frames, and edge strength information. The optical flow information may be information of a macro block unit in the ME block 320.

The FG region may include at least one large mass of the object based on the focus region (e.g., Face Detection Region of Interest (FD ROI)). For example, in case of a person, a head and a body including a face region may be detected as the FG region. The BG region may include a background region where there is an object.

The region segmentation block 331 may generate a label map indicated by dividing the optical flow information of the YUV format raw image into an FG region, a BG region, and a gray region, respectively.

The global motion estimation block 332 may estimate a motion vector based on a global motion model for each macro region by using the label map in the optical flow information. In an embodiment, a homography matrix may be used for the global motion model. For example, the FG region may be estimated as a first global motion vector H_FG to which the homography matrix is applied, and the BG region may be estimated as a second global motion vector H_BG.

The local motion estimation block 333 may detect an outlier by comparing the first global motion vector and the second global motion vector with the optical flow information. For example, the local motion estimation block 333 may detect an outlier of the first or second global motion vector H_FG or H_BG from each of the FG region and the BG region based on edge strength and brightness information of the optical flow information. In this case, values that are not detected as outliers when a global motion vector value is observed without division between the FG region and the BG region may be detected as the outliers when the global motion vector value is observed by division between the FG region and the BG region. Thus, when a certain pattern is included in the FG region or the BG region, the pattern may be detected as an outlier.

The local motion estimation block 333 may remove the outliers from the first global motion vector and the second global motion vector, and may update labels of macro blocks belonging to the gray region in the first and second global motion vectors from which the outliers have been removed. Thus, when the first and second global motion vectors from which the outliers have been removed are compared with the optical flow information, the macro block of the gray region (which is ambiguous whether it is the FG region or the BG region) may be determined as a motion vector value close to one region (second gray region). In various implementations, the motion vector of the macro block that is ambiguous may be calculated as a weighted average value of the FG region and the BG region. However, even after the outliers are removed, the macro block (first gray region) which is ambiguous as to whether it is the FG region or the BG region may continue to remain as the gray region.

The local motion estimation block 333 may output refined first and second global motion vectors H_FG' and H_BG' generated by reflecting the motion vector of the updated gray region of which outlier has been removed.

The MC block 340 may perform motion compensation by applying the refined first and second global motion vectors to the previous frame stored in the memory 120.

The mixer 350 may blend the motion-compensated previous frame Prev_FR' with the current frame Curr_FR to output the motion-compensated current frame Curr_FR'. Therefore, the motion-compensated current frame Curr_FR' may be an image from which time-axis noise has been removed.

Figure 4:
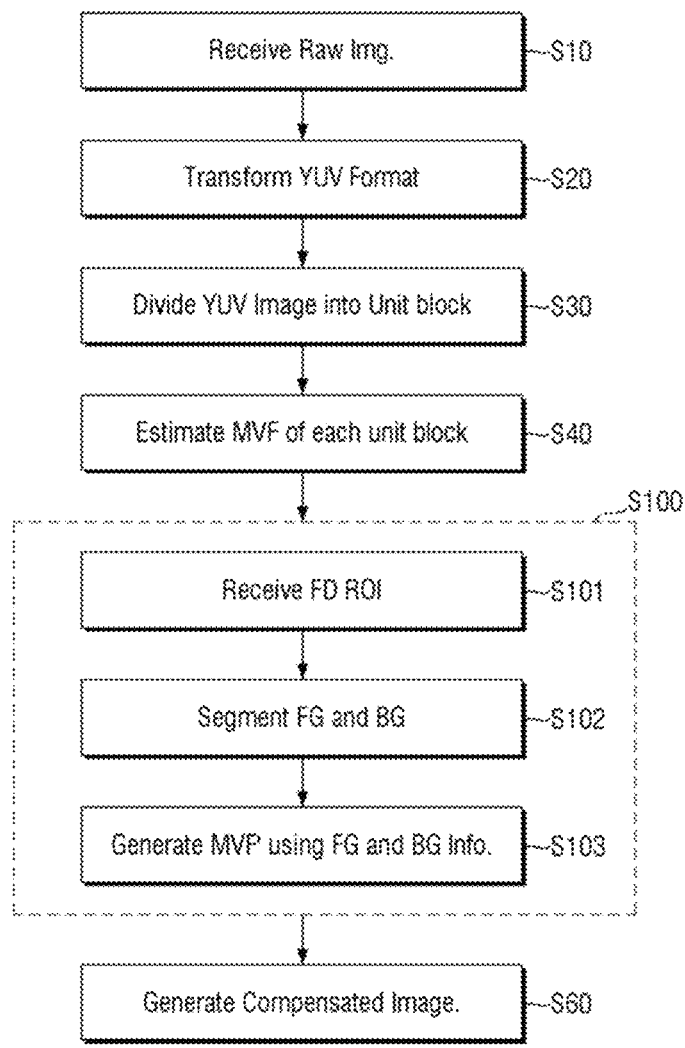
FIG. 4 is a flow chart illustrating an image processing method according to some embodiments.
Figure 5:
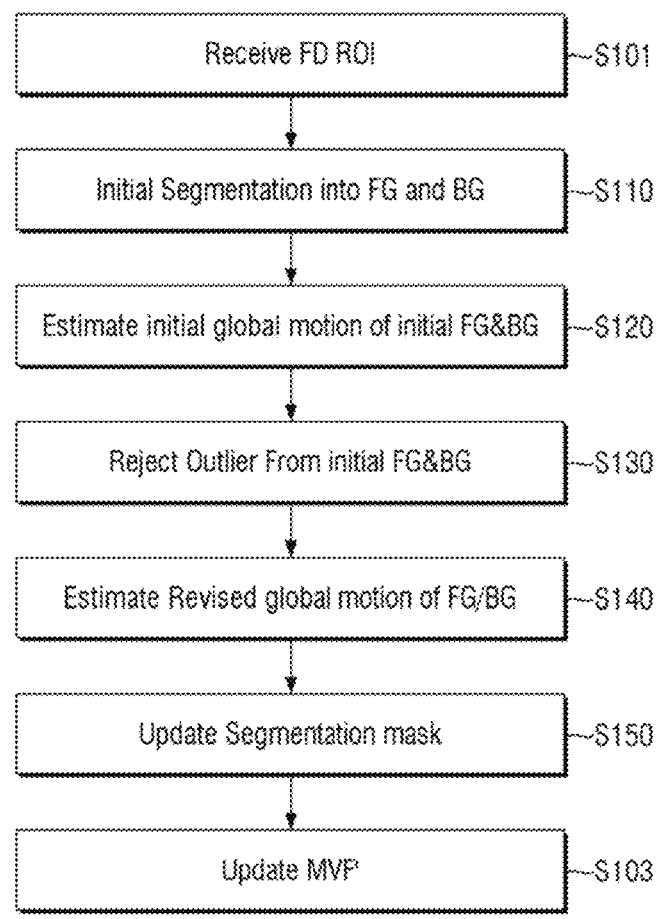
FIG. 5 is a flow chart illustrating an operation S100 of FIG. 4 according to some embodiments.
Figure 6:
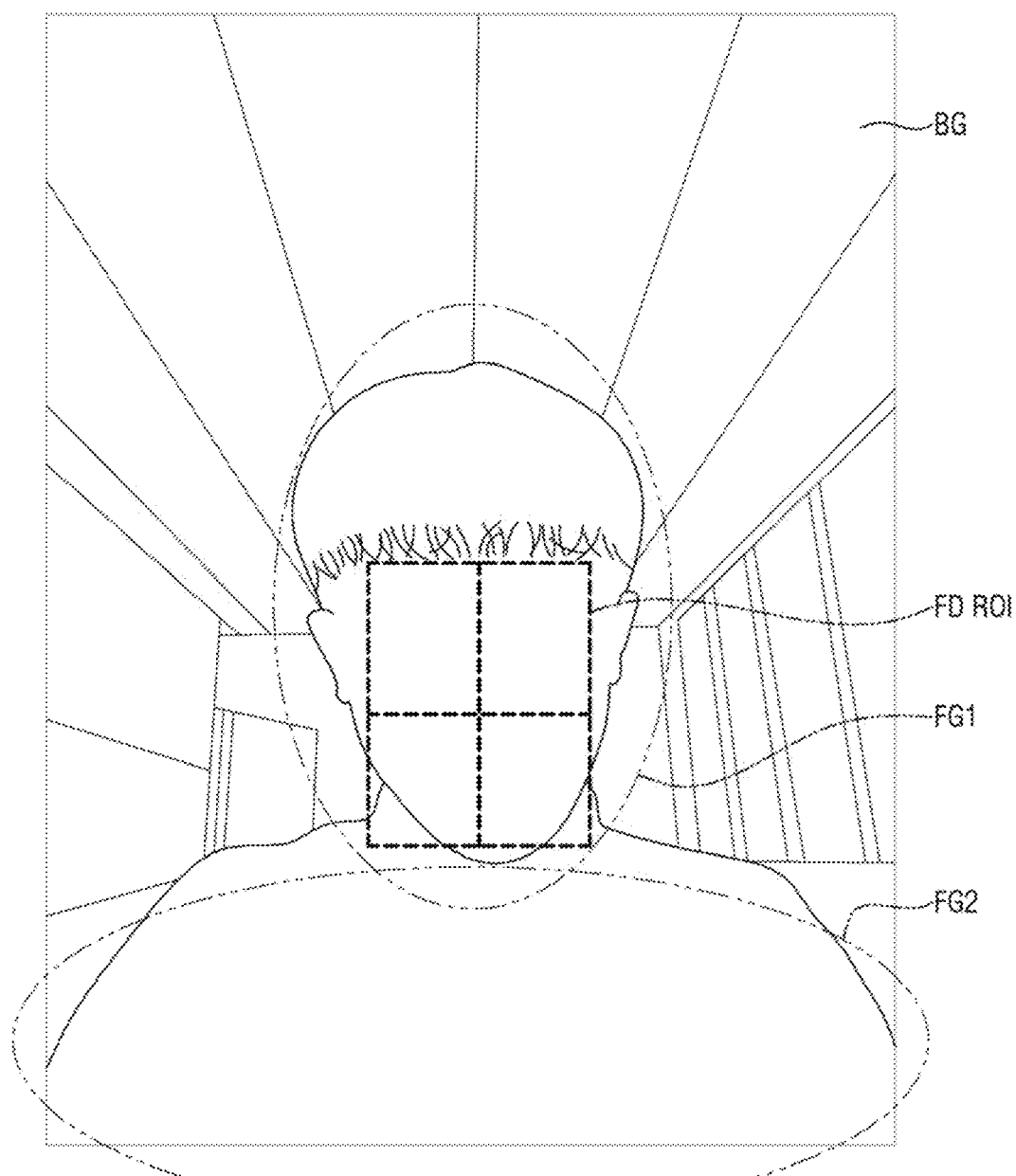
FIG. 6 is an image illustrating a foreground region and a background region, which are estimated based on focus region information from a raw image captured in accordance with some embodiments.

FIG. 4 is a flow chart illustrating an image processing method according to some embodiments. FIG. 5 is a flow chart illustrating an operation S100 of FIG. 4 according to some embodiments. FIG. 6 is an image illustrating a foreground region and a background region, which are estimated based on focus region information from a raw image captured in accordance with some embodiments. FIG. 7 is an image illustrating initial detection of the image of FIG. 6 as a foreground region, a background region, and a gray region in accordance with some embodiments. FIG. 8 is an image illustrating that the foreground region, the background region, and the gray region of the image of FIG. 7 are readjusted by applying motion compensation thereto.

Although FIGS. 4 and 5 will be described with reference to FIGS. 6 to 8 for understanding of description, FIGS. 6 to 8 are merely examples, and embodiments may vary.

Referring to FIG. 4, the ISP 300 may receive a raw image of RGB format from the camera module (S10).

The ISP 300 may transform the raw image into YUV format based on luminance (S20).

The raw image of YUV format may be segmented into macro blocks having a preset size (S30).

Therefore, the raw image may be segmented into a plurality of macro blocks including a plurality of rows and columns. For example, in FIGS. 7 and 8, a grid displayed on the raw image indicates macro blocks arranged in a plurality of rows and columns.

The ISP 300 may estimate the initial global motion vector field MVF for each macro block (S40).

The initial MVF means a motion path of an inter-frame feature point between the previous frame and the current frame. For example, the initial MVF may mean position coordinate movement of the macro block between the previous frame and the current frame based on a position of a vertex of rounded sides of a nose in the face region.

The ISP 300 may receive focus region information detected in accordance with neural network learning (S101).

For example, in case of a raw image obtained by capturing the face of a person as shown in FIG. 6, the ISP 300 may extract the face region including eyes, nose, and mouth as a feature point (or reference point), and learns the face region including chin line-forehead based on the feature point as the focus region information. The neural network may determine the focus region information by learning a range included in the face region in consideration of facial expression, pose, hairstyle, etc. In the example of FIG. 6, it is assumed that a rectangular region including the face is determined as focus region information.

The ISP 300 may segment a mass and a background of an object in a raw image into a foreground region and a background region based on the focus region information (S102).

For example, referring to FIG. 6, a head region FG1 including the focus region information and a body region FG2 under the head region may be detected as a foreground region, and the other portion BG may be separated into a background region.

The ISP 300 may re-estimate the global motion vector information of each region based on the foreground region and background region information. Thus, the ISP 300 may re-estimate the first global motion vector and the second global motion vector with respect to the foreground region and the background region, and update the initial MVF by using the re-estimated first and second global motion vectors to generate a final MVF' (S103).

The ISP 300 may generate a motion-compensated previous frame by applying the final MVF' to the previous frame (S60), and blend the motion-compensated previous frame with the current frame to output a final current frame image from which time-axis noise has been removed.

The operation S100 (operations S101, S102 and S103) will be described in more detail with reference to FIG. 5.

As described above, the initial segmentation may be performed based on the focus region information so that the raw image is divided into the foreground region and the background region (S110), and the initial global motion vector may be estimated based on the initial foreground region and the initial background region (S120). At this time, since the raw image is segmented into a plurality of macro blocks in operation S40, coordinate movement information of the macro block corresponding to the feature point may be estimated as the initial global motion vector. The ISP 300 may generate a label map indicating a foreground region (FG), a background region (BG), and gray regions Gray1 and Gray2 in the initial global motion vector.

The ISP 300 may detect an outlier by separating the first global motion vector of the FG region and the second global motion vector of the BG region from the label map (S130). Operation S130 may include removing the outlier.

In the first global motion vector and the second global motion vector, from which the outlier has been removed, the ISP 300 may update the label of the partial gray region based on the optical flow information (S140). Thus, the label of the partial gray region may be further incorporated into the FG region or the BG region.

For example, when the label map of FIG. 7 and the label map of FIG. 8 are compared with each other, the labels of Gray1 and Gray2 of FIG. 7 (which indicate the initial global motion vector) are updated in FIG. 8, whereby it is noted that the gray region (particularly, Gray2) is partially reduced at a boundary between the FG region and the BG region.

Based on the updated label from which an outlier has been removed, the label map may be entirely corrected (S150), and the initial global motion vector may be updated to the final global motion vector (MVF') based on the corrected label map (S103).

Figure 9:
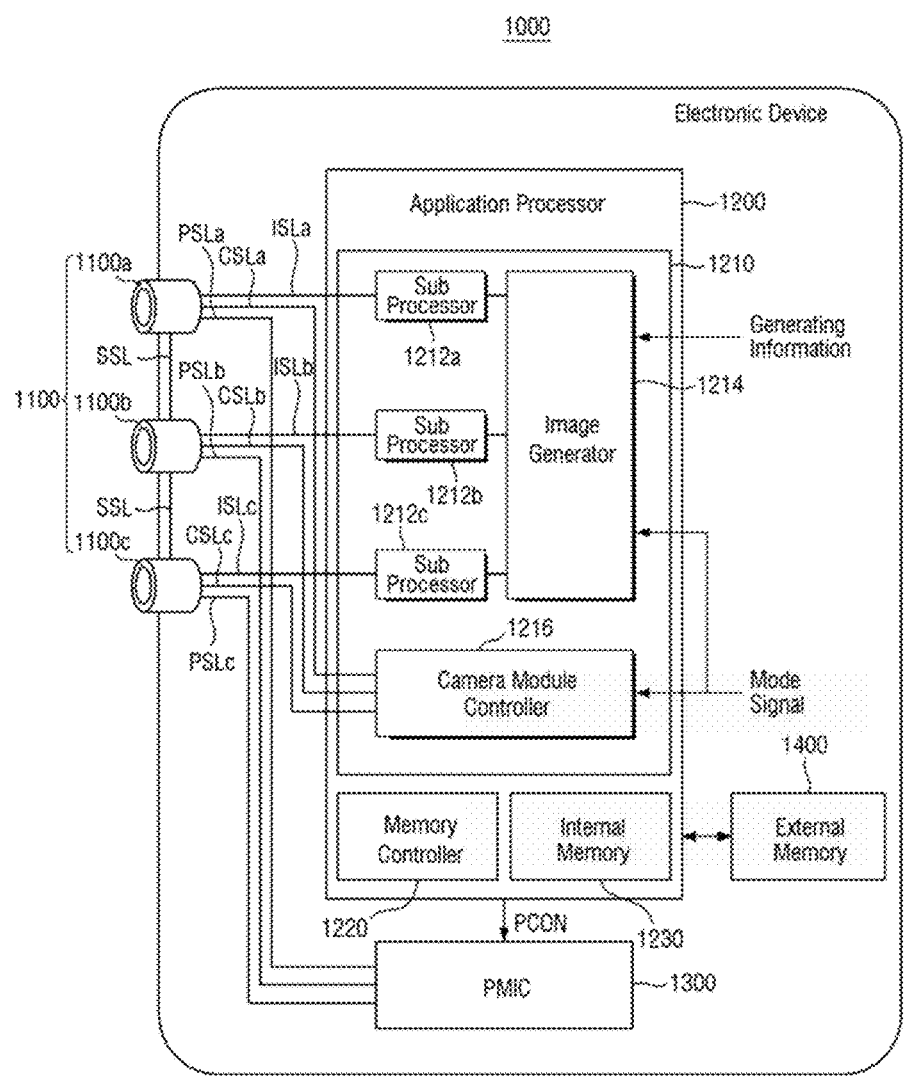
FIG. 9 is a block diagram of an electronic device that includes a multi-camera module according to some embodiments.
Figure 10:
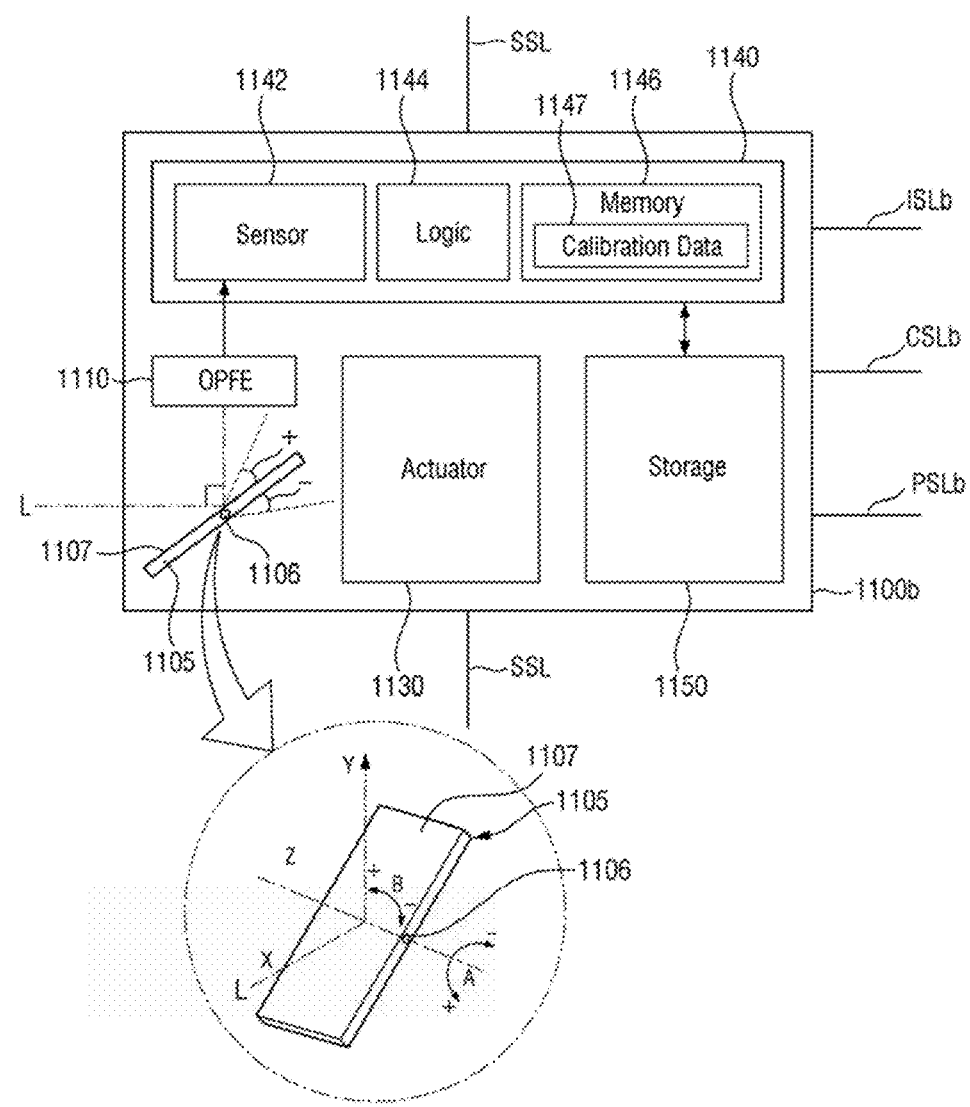
FIG. 10 is a detailed block diagram of the camera module of FIG. 9.

FIG. 9 is a block diagram of an electronic device that includes a multi-camera module according to some embodiments. FIG. 10 is a detailed block diagram of the camera module of FIG. 9.

Referring to FIG. 9, the electronic device 1000 may include a camera module group 1100, an application processor 1200, a PMIC 1300, and an external memory 1400.

The camera module group 1100 may include a plurality of camera modules 1100a, 1100b, and 1100c. Although three camera modules 1100a, 1100b, and 1100c are shown, in some embodiments, the camera module group 1100 may be modified to include only two camera modules, or the camera module group 1100 may be modified to include n number of camera modules (n is a natural number of 4 or more).

Hereinafter, a detailed configuration of the camera module 1100b will be described in more detail with reference to FIG. 10. However, the following description is equally applicable to the other camera modules 1100a and 1100c in accordance with an embodiment.

Referring to FIG. 10, the camera module 1100b may include a prism 1105, an optical path folding element (hereinafter, referred to as "OPFE") 1110, an actuator 1130, an image sensing device 1140, and a storage 1150.

The prism 1105 may include a reflective surface 1107 of a light reflecting material to deform a path of light L incident from the outside.

In some embodiments, the prism 1105 may change the path of the light L incident in a first direction X to a second direction Y perpendicular to the first direction X. Also, the prism 1105 may rotate the reflective surface 1107 of the light reflecting material in a direction A based on a central axis 1106, or may rotate the central axis 1106 in a direction B to change the path of the light L incident in the first direction X to the second direction Y. At this time, the OPFE 1110 may move in a third direction Z perpendicular to the first direction X and the second direction Y.

In some embodiments, as shown, a maximum rotational angle of the prism 1105 in the direction A may be 15 degrees or less in a direction plus (+) A and greater than 15 degrees in a direction minus (−) A.

In some embodiments, the prism 1105 may move at 20 degrees or so in a direction plus (+) or minus (−) B, or between 10 degrees and 20 degrees, or between 15 degrees and 20 degrees, wherein the moving angle may be the same angle in the direction plus (+) or minus (−) B, or may be an angle approximately similar to a range of 1 degree or so.

In some embodiments, the prism 1105 may move the reflective surface 1107 of the light reflecting material in a third direction (e.g., direction Z) parallel with an extension direction of the central axis 1106.

The OPFE 1110 may include, e.g., an optical lens including m number of groups (m is a natural number). The m number of lenses may move in the second direction Y to change an optical zoom ratio of the camera module 1100b. For example, when a basic optical zoom ratio of the camera module 1100b is Z, and the m number of optical lens included in the OPFE 1110 move, the optical zoom ratio of the camera module 1100b may be changed to an optical zoom ratio of 3Z or 5Z, or 5Z or more.

The actuator 1130 may move the OPFE 1110 or the optical lens to a particular position. For example, for accurate sensing, the actuator 1130 may adjust the position of the optical lens such that the image sensor 1142 is positioned at a focal length of the optical lens.

The image sensing device 1140 may include an image sensor 1142, a control logic 1144, and a memory 1146. The image sensor 1142 may sense an image of a sensing target by using the light L provided through the optical lens. The control logic 1144 may control the overall operation of the camera module 1100b. For example, the control logic 1144 may control the operation of the camera module 1100b in accordance with a control signal provided through a control signal line CSLb.

The memory 1146 may store information, which is used for the operation of the camera module 1100b, such as calibration data 1147. The calibration data 1147 may include information used for the camera module 1100b to generate image data by using the light L provided from the outside. The calibration data 1147 may include, e.g., information on a degree of rotation, information on a focal length, information on an optical axis, etc. When the camera module 1100b is implemented in the form of a multi-state camera type in which the focal length varies depending on the position of the optical lens, the calibration data 1147 may include information related to a focal length value and auto focusing for each position (or state) of the optical lens.

The storage 150 may store image data sensed through the image sensor 1142. The storage 1150 may be disposed outside the image sensing device 1140, and may be implemented in a stacked configuration with a sensor chip constituting the image sensing device 1140. In some embodiments, the storage 1150 may be implemented as an electrically erasable programmable read-only memory (EEPROM).

Referring to FIGS. 9 and 10, in some embodiments, each of the plurality of camera modules 1100a, 1100b, and 1100c may include an actuator 1130. Therefore, the plurality of camera modules 1100a, 1100b, and 1100c may include the same or different calibration data 1147 according to the operation of the actuator 1130 included therein.

In some embodiments, one (e.g., 1100b) of the plurality of camera modules 1100a, 1100b, and 1100c may be a folded lens type camera module that includes the prism 1105 and the OPFE 1110, which are described above, and the other camera modules (e.g., 1100a and 1100c) may be vertical type camera modules that do not include the prism 1105 and the OPFE 1110.

In some embodiments, one (e.g., 1100c) of the plurality of camera modules 1100a, 1100b, and 1100c may be a vertical depth camera that extracts depth information by using, e.g., an infrared ray (IR). In this case, the application processor 1200 may merge image data provided from the depth camera with image data provided from another camera module (e.g., 1100a or 1100b) to generate a 3D depth image.

In some embodiments, at least two (e.g., 1100a and 1100b) of the plurality of camera modules 1100a, 1100b, and 1100c may have their respective field of views (viewing angles) different from each other. In this case, e.g., the optical lens of at least two (e.g., 1100a and 1100b) of the plurality of camera modules 1100a, 1100b, and 1100c may be different from each other.

Also, in some embodiments, viewing angles of the plurality of camera modules 1100a, 1100b, and 1100c may be different from one another. In this case, the optical lenses respectively included in the plurality of camera modules 1100a, 1100b, and 1100c may be different from one another.

In some embodiments, the plurality of camera modules 1100a, 1100b, and 1100c may be disposed to be physically divided from one another. Thus, a sensing region of one image sensor 1142 is not used by segmenting the plurality of camera modules 1100a, 1100b, and 1100c but an independent image sensor 1142 may be disposed inside each of the plurality of camera modules 1100a, 1100b, and 1100c.

Referring back to FIG. 9, the application processor 1200 may include an image processing device 1210, a memory controller 1220, and an internal memory 1230. The application processor 1200 may be implemented to be divided from the plurality of camera modules 1100a, 1100b, and 1100c. For example, the application processor 1200 and the plurality of camera modules 1100a, 1100b, and 1100c may be implemented as separate semiconductor chips that are divided from each other.

The image processing device 1210 may include a plurality of sub image processors 1212a, 1212b, and 1212c, an image generator 1214, and a camera module controller 1216.

The image processing device 1210 may include a plurality of sub image processors 1212a, 1212b, and 1212c corresponding to the number of the plurality of camera modules 1100a, 1100b, and 1100c.

The image data generated from each of the camera modules 1100a, 1100b, and 1100c may be provided to the corresponding sub image processors 1212a, 1212b, and 1212c through image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. Such image data transmission may be performed using, e.g., a camera serial interface (CSI) based on a Mobile Industry Processor Interface (MIPI).

In some embodiments, one sub image processor may be disposed to correspond to the plurality of camera modules. For example, the sub image processor 1212a and the sub image processor 1212c may not be implemented to be divided from each other as shown, but may be implemented to be integrated into one sub image processor. The image data provided from the camera module 1100a and the camera module 1100c may be selected through a selection element (e.g., multiplexer) or the like, and then may be provided to an integrated sub image processor.

The image data provided to each of the sub image processors 1212a, 1212b, and 1212c may be provided to the image generator 1214. The image generator 1214 may generate an output image by using the image data provided from each of the sub image processors 1212a, 1212b, and 1212c in accordance with image generating information or a mode signal.

In detail, the image generator 1214 may merge at least a portion of the image data generated from the camera modules 1100a, 1100b, and 1100c having different viewing angles in accordance with the image generating information or the mode signal to generate an output image. In addition, the image generator 1214 may select any one of the image data generated from the camera modules 1100a, 1100b, and 1100c having different viewing angles in accordance with the image generating information or the mode signal to generate an output image.

In some embodiments, the image generating information may include a zoom signal or zoom factor. Further, in some embodiments, the mode signal may be a signal based on a mode selected from, e.g., a user.

When the image generating information is the zoom signal (zoom factor) and the camera modules 1100a, 1100b, and 1100c have their respective field of views (viewing angles) different from one another, the image generator 1214 may perform different operations depending on a type of the zoom signal. For example, when the zoom signal is a first signal, after the image data output from the camera module 1100a and the image data output from the camera module 1100c are merged with each other, an output image may be generated using the merged image signal and the image data output from the camera module 1100b, which is not used for merging. When the zoom signal is a second signal different from the first signal, the image generator 1214 may select any one of the image data output from the respective camera modules 1100a, 1100b, and 1100c to generate an output image without performing such image data merging. A method of processing image data may be modified.

In some embodiments, the image generator 1214 may receive a plurality of image data having different exposure times from at least one of the plurality of sub image processors 1212a, 1212b, and 1212c, and may perform high dynamic range (HDR) processing for the plurality of image data, thereby generating merged image data with an increased dynamic range.

The camera module controller 1216 may provide a control signal to each of the camera modules 1100a, 1100b, and 1100c. The control signals generated from the camera module controller 1216 may be provided to the corresponding camera modules 1100a, 1100b, and 1100c through control signal lines CSLa, CSLb, and CSLc that are divided from one another.

Any one of the plurality of camera modules 1100a, 1100b, and 1100c may be designated as a master camera (e.g., 1100b) in accordance with the image generating information, which includes the zoom signal, or the mode signal, and the other camera modules (e.g., 1100a and 1100c) may be designated as slave cameras. This information may be included in the control signal, and then may be provided to the corresponding camera modules 1100a, 1100b, and 1100c through the control signal lines CSLa, CSLb, and CSLc that are divided from one another.

The camera modules operating as a master and slave may be changed depending on the zoom factor or operation mode signal. For example, when the viewing angle of the camera module 1100a is wider than that of the camera module 1100b and the zoom factor indicates a low zoom ratio, the camera module 1100b may operate as a master, and the camera module 1100a may operate as a slave. On the other hand, when the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit a sync enable signal to the camera module 1100b. The camera module 1100b that has received the sync enable signal may generate a sync signal based on the received sync enable signal, and may provide the generated sync signal to the camera modules 1100a and 1100c through a sync signal line SSL. The camera module 1100b and the camera modules 1100a and 1100c may be synchronized with the sync signal to transmit the image data to the application processor 1200.

In some embodiments, the control signal provided from the camera module controller 1216 to the plurality of camera modules 1100a, 1100b, and 1100c may include mode information according to the mode signal. Based on the mode information, the plurality of camera modules 1100a, 1100b, and 1100c may operate in a first operating mode and a second operating mode in relation to a sensing rate.

In the first operation mode, the plurality of camera modules 1100a, 1100b, and 1100c may generate an image signal at a first rate (e.g., generate an image signal of a first frame rate) to encode the image signal at a second rate higher than the first rate (e.g., encode the image signal of a second frame rate higher than the first frame rate), and may transmit the encoded image signal to the application processor 1200. The second rate may be 30 times or less of the first rate.

The application processor 1200 may store the received image signal, i.e., the encoded image signal, in the internal memory 1230 or the external memory 1400 outside the application processor 1200, read and decode the image signal encoded from the internal memory 1230 or the external memory 1400, and display the generated image data based on the decoded image signal. For example, a corresponding sub processor of the plurality of sub image processors 1212a, 1212b, and 1212c of the image processing device 1210 may perform decoding, and may also perform image processing for the decoded image signal.

In the second operation mode, the plurality of camera modules 1100a, 1100b, and 1100c may generate an image signal at a third rate lower than the first rate (e.g., generate an image signal of a third frame rate lower than the first frame rate) and transmit the image signal to the application processor 1200. The image signal provided to the application processor 1200 may be an unencoded signal. The application processor 1200 may perform image processing for the received image signal or store the image signal in the internal memory 1230 or the external memory 1400.

The PMIC 1300 may supply power, e.g., a power voltage, to each of the plurality of camera modules 1100a, 1100b, and 1100c. For example, the PMIC 1300 may supply first power to the camera module 1100a through a power signal line PSLa under the control of the application processor 1200, supply second power to the camera module 1100*b* through a power signal line PLSb, and supply third power to the camera module 1100*c* through a power signal line PLSc.

The PMIC 1300 may generate power corresponding to each of the plurality of camera modules 1100*a*, 1100*b*, and 1100*c*, and adjust a level of the power in response to a power control signal PCON from the application processor 1200. The power control signal PCON may include a power adjustment signal for each operation mode of the plurality of camera modules 1100*a*, 1100*b*, and 1100*c*. For example, the operation mode may include a low power mode, and in this case, the power control signal PCON may include information on a camera module operating in the low power mode and information on a power level that is set. The levels of the powers respectively provided to the plurality of camera modules 1100*a*, 1100*b*, and 1100*c* may be the same as or different from one another. Further, the level of the power may dynamically be changed.

By way of summation and review, an electronic device may calculate image stabilization information based on a motion path of a camera, and may generate a new image, of which shaking is corrected, based on the calculated image stabilization information. Temporal noise reduction (TNR) is to reduce noise generated whenever a frame is repeated on a time axis by blending a previous frame with a current frame of a photographed image. When the camera moves, or when an object moves even when the camera is fixed to a tripod, a motion path should be estimated prior to blending between the two frames, so as to compensate for motion. When the motion path is not accurately estimated, noise removal performance may be deteriorated, and pixel values at different positions between two frames may be blended, whereby a wobbling phenomenon may occur, in which an image may wobble.

As described above, embodiments may provide an image processing device and an image signal processor, in which temporal noise indicated during blending between frames is reduced.

Example embodiments have been disclosed herein, and although specific terms are employed, they are used and are to be interpreted in a generic and descriptive sense only and not for purpose of limitation. Terms such as "unit", "module" and "block" used in the detailed description or functional blocks shown in the drawings may be implemented in the form of hardware, software, or combination thereof, which is configured to perform a specific function. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image processing device, comprising:
   an image signal processor for processing a raw image received from a camera; and
   a memory for storing a previous frame of the raw image and an intermediate image generated by the processing,
   wherein the image signal processor:
      estimates an initial global motion vector between the previous frame and a current frame,
      receives focus region information in the raw image,
      divides the raw image into a foreground (FG) region and a background (BG) region based on the focus region information,
      generates a final global motion vector by divisionally updating the initial global motion vector based on the FG region and the BG region,
      performs motion compensation by applying the final global motion vector to the previous frame, and
      outputs a final image by blending the motion-compensated previous frame with the current frame.

2. The image processing device as claimed in claim 1, wherein the focus region information is a feature region of an object detected using a neural network from the raw image.

3. The image processing device as claimed in claim 2, wherein the focus region information is face region information when the object is a person.

4. The image processing device as claimed in claim 1, wherein the focus region information is received from a neural network processing unit.

5. The image processing device as claimed in claim 1, wherein the estimation of the initial global motion vector includes: segmenting the raw image into macro blocks, and estimating optical flow information between the previous frame and the current frame for each macro block.

6. The image processing device as claimed in claim 5, wherein the optical flow information includes a motion vector field, a brightness difference, and an edge strength information between the previous frame and the current frame.

7. The image processing device as claimed in claim 5, wherein the estimation of the initial global motion vector includes removing an outlier that is out of a preset threshold value from the optical flow information.

8. The image processing device as claimed in claim 7, wherein the outlier is separately detected from each of a first global motion vector of the FG region and a second global motion vector of the BG region, and then removed.

9. The image processing device as claimed in claim 7, wherein the division of the raw image into the FG region and the BG region includes:
   generating a label map for each macro block by dividing the FG region, the BG region, and a gray region, which include the focus region information, from one another.

10. The image processing device as claimed in claim 9, wherein the estimation of the initial global motion vector further includes updating a motion vector of the gray region based on the first global motion vector, the second global motion vector, and optical flow information.

11. An image processing device, comprising:
   a camera module for outputting a raw image captured by a camera;
   a neural processing unit for detecting focus region information from the raw image; and
   an application processor for separating the raw image for each region in accordance with the focus region information, generating a final global motion vector updated from an initial global motion vector, and outputting a final image to which the final global motion vector is applied, wherein the application processor is configured to:
      segment the raw image into a plurality of macro blocks including a plurality of rows and columns,
      estimate the initial global motion vector by comparing a previous frame with a current frame for each macro block, divide the raw image into a foreground region, a background region, and a gray region in accordance with the focus region information, remove an outlier from each of a first global motion vector for the foreground region and a second global motion vector for the background region, and generate the final global motion vector by updating the gray region based on the first and second global motion vectors from which the outlier has been removed, wherein the gray region is a region whose value is not initially determined as being the foreground region or the background region, among the plurality of macro blocks.

12. The image processing device as claimed in claim 11, wherein the application processor generates a label map, which indicates the foreground region, the background region, and the gray region, for each macro block.

13. The image processing device as claimed in claim 11, wherein the foreground region is a region in which a mass of an object including the focus region information is captured.

14. The image processing device as claimed in claim 11, wherein the application processor corrects a motion vector of each of the macro blocks belonging to the gray region based on the first and second global motion vectors from which the outlier has been removed.

15. The image processing device as claimed in claim 11, wherein the application processor performs motion compensation for the previous frame by using the final global motion vector, and generates the final image to blend the motion-compensated previous frame with the current frame.

16. An image signal processor, comprising:

a pre-processing block for receiving a raw image from a photograph taken by a camera module to transform a format of the raw image;

a motion estimation block for segmenting the transformed raw image into a plurality of macro blocks and estimating an initial global motion vector between a previous frame and a current frame;

a motion estimation real time algorithm block (ME RTA block) for generating a label map that has divided the plurality of macro blocks into a plurality of regions based on focus region information, and outputting a final global motion vector updated from the initial global motion vector based on the label map;

a motion compensation block for performing motion compensation for the previous frame based on the final global motion vector; and a mixer for outputting a final image obtained by blending the motion-compensated previous frame with the current frame, the final image representing the photograph taken by the camera.

17. The image signal processor as claimed in claim 16, wherein the ME RTA block includes: a region segmentation block for generating the label map from optical flow information of the transformed raw image based on the focus region information; a global motion estimation block for generating a global motion vector for each region by using the label map; and a local motion estimation block for removing an outlier from the global motion vector for each region and refining the initial global motion vector to output the final global motion vector.

18. The image signal processor as claimed in claim 17, wherein: the plurality of regions include a foreground region, a background region, and a gray region, and the local motion estimation block corrects a motion vector of the gray region based on a first global motion vector of the foreground region and a second global motion vector of the background region, from which the outlier has been removed.

19. The image signal processor as claimed in claim 16, wherein the focus region information is received from a neural network processing unit.

* * * * *